United States Patent

Knox et al.

[11] Patent Number: 5,837,376
[45] Date of Patent: Nov. 17, 1998

[54] POSTFORMING DECORATIVE LAMINATES

[75] Inventors: David E. Knox; Edward P. Klein, both of Goose Creek; Robert C. Streisel; Stanley M. Nuzum, both of Mt. Pleasant, all of S.C.

[73] Assignee: Westvaco Corporation, New York, N.Y.

[21] Appl. No.: 576,447

[22] Filed: Dec. 21, 1995

Related U.S. Application Data

[63] Continuation-in-part of Ser. No. 426,531, Apr. 28, 1995, abandoned, which is a continuation-in-part of Ser. No. 188,718, Jan. 31, 1994, Pat. No. 5,443,902.

[51] Int. Cl.$^6$ ...................................................... B32B 29/00
[52] U.S. Cl. .......................... 428/340; 428/503; 428/511; 428/530; 428/534; 428/535; 428/537; 428/5
[58] Field of Search ...................... 428/340, 503, 428/511, 534, 535, 536, 537.5, 530, 322.2, 219, 297, 369; 162/9

[56] References Cited

U.S. PATENT DOCUMENTS

| | | | |
|---|---|---|---|
| 4,036,679 | 7/1977 | Back et al. | 162/9 |
| 4,060,450 | 11/1977 | Palazzolo et al. | 162/141 |
| 4,431,479 | 2/1984 | Barbe et al. | 162/9 |
| 5,443,902 | 8/1995 | Knox et al. | 428/340 |

*Primary Examiner*—Marie Yamnitzky
*Attorney, Agent, or Firm*—Terry B. McDaniel; Daniel B. Reece, IV; Richard L. Schmalz

[57] ABSTRACT

Improvements in the construction of postformable laminates are disclosed by the provision of a single high basis weight sheet exhibiting improved saturation and resin pick up characteristics and formed predominantly of hardwood pulp which pulp has been mechanically treated to effectively impart kinking and curling to the individual pulp fibers.

16 Claims, 1 Drawing Sheet

POSTFORMING DECORATIVE LAMINATES

This is a continuation-in-part application of U.S. patent application Ser. No. 08/426,531, filed on Apr. 28, 1995 (now abandoned), which is a continuation-in-part application of U.S. patent application Ser. No. 08/188,718, filed on Jan. 31, 1994, which issued as U.S. Pat. No. 5,443,902, on Aug. 22, 1995.

BACKGROUND OF THE INVENTION

1. Field of the Invention

The present invention relates to new and useful improvements in paper manufacture and, more directly, relates to the provision of resin absorbent papers for the manufacture of high and low pressure fiber reinforced plastic laminates with improved postforming characteristics.

2. Description of the Prior Art

Postforming laminates are laminates that, after initial curing in a press, can be reheated along an axis and bent to give a material that has smooth, round, undamaged surfaces in either the forward or the backward direction. Such bends are depicted in FIG. 1. Forward bend 1 (sometimes called a "bullnose bend"), where the decorative side (or layer) 3 of the laminate is in tension, is generally a large radius bend exhibiting a radius of ¼ inch to ½ inch. Tight bends with small radii may lead to damage in the laminate that can appear upon forming or at a later time in use and give failures that would be correctable only at great expense. Attempts to bend the decorative side in tension around a very tight radius (i.e., $1/16$ inch to $3/16$ inch) generally are unsuccessful due to the relatively high modulus with low elongation at break of the decorative layer. In general, forward bends of laminates are done at larger radii.

In contrast, a backward bend 2 of a laminate, where the decorative side 3 of the laminate is in compression and the core side 4 (shown in FIGS. 2 and 3 to be comprised of internal core sheets 5 covered with one or more postforming sheets 6 or 7, respectively) is in tension, generally is postformed to much tighter radii. This is due to the fact that the core side 4 of the laminate, which is impregnated with phenol/formaldehyde resin, can, by using appropriate paper or resin modifications, be made to have a lower modulus with a higher elongation at break than the decorative side 3. Another reason for the tighter attainable radii is the fact that the outer (tension) layer of the core side 4 can be modified to give a laminate that is better able to tolerate tensile strains imposed on it during bending. Summarizing, decorative postforming laminates must be able to be bent with either the decorative or the core side in both tension and compression.

A number of approaches have been taken to improve the performance of decorative postforming laminate bends. The prior art comprises various modifications to improve the bending ability of the decorative laminates in the forward direction. Improvements in the forward bends can be made by changing the furnish of the paper. For example, U.S. Pat. No. 3,327,084 teaches the use of low coarseness (thin and long) fibers as being superior to the use of thicker, high-coarseness fibers. Improvements in crazing, which is the undesirable tendency of the laminate to have cracking on the surface, were noted with the lower coarseness fibers. Shorter fiber species, (e. g., hardwoods) which may have low coarseness, were indicated as being inferior in postforming characteristics. In addition, the use of low denier synthetic fibers such as nylon and acrylic fibers was found to give improvements in crazing when used at levels of between 35% and 100% in the paper. Although this technology appears viable, the use of longer fiber length, low coarseness, natural fibers generally limits the papermaker to juvenile trees or slow-growing northern species, and synthetic fibers are considerably more expensive than wood fibers.

A second means of adding postformability to a laminate, especially in the forward (or, bullnose) direction, is to modify the melamine resin that is used to impregnate the decorative layer. Several modifications to the decorative layer have been described including the use of caprolactams (U.S. Pat. No. 2,584,177), glucosides (U.S. Pat. No. 2,773,788), carbamates (U.S. Pat. No. 2,937,966), mannatin (U.S. Pat. No. 3,194,723), epoxies (U.S. Pat. No. 4,046,937), and polyethyleneglycols (U.S. Pat. No. 4,405,690).

Several prior art references describe modifications to the phenolic resin in the core sheets. These modifications include the use of water/glycerol, as in Canadian Patent No. 778,750, to enhance the performance of forward bends by enabling the core to undergo greater compressive failure, inducing less tensile strain in the decorative layer. In Canadian Patent No. 894,859, the use of glycols and fatty acid oils as coreactants for the phenolic resin is described. In all cases, however, these materials were used to improve the appearance of the forward bend.

Current commercial postforming laminates employ one or several lightweight sheets on the back of the laminate. This laminate construction is shown in FIG. 2 to be comprised of the decorative layer (or side) 3 and the core side 4. The lightweight postforming sheets 6 that are used on the back of this laminate are a multi-walled sack paper that is made from northern low coarseness softwood. It has been accepted that high CD stretch in a paper sheet is necessary for use in the postforming layer of a laminate.

Paper of this type is available in low basis weights of 75 lbs./3000 ft$^2$ from RePap Industries in LaPas, Alberta, Canada. The primary market for this paper is bag stock rather than laminates. Although this paper is known to give good bending characteristics to the laminate, it suffers from several deficiencies including poor inherent treatability (due to sheet construction) and low basis weight. For standard horizontal grade postforming laminates of about 0.037 inch thickness, the postforming sheets comprise about ⅓ of the mass of a laminate, and two 75 lbs./3000 ft$^2$ sheets must be used. Therefore, twice as many linear feet of paper must be treated compared to having a product which requires only one sheet of 150 lbs./3000 ft$^2$. In addition, since the lighter weight papers are designed as extensible sheets, they tend to give poor dimensional stability to laminates. The use of multiple sheets with low basis-weight also requires additional collating costs in the layup of the laminate. Thus, the current commercial product results in relatively slow production rates and higher costs to the laminator.

U.S. Pat. No. 5,443,902 describes an invention to provide a sheet prepared predominantly with softwood fibers that overcomes many of the problems associated with the current commercial product; specifically, it provides a high basis weight sheet that is easier to treat and less costly to use than the lighter-weight products. Experience with this sheet, however, disclosed that the lamination process is hampered by the very fast resin saturation into the sheet. Therefore, it is an object of this invention to provide an improved high basis weight postforming sheet exhibiting reduced resin saturation into the sheet.

SUMMARY OF THE INVENTION

Figure 1:
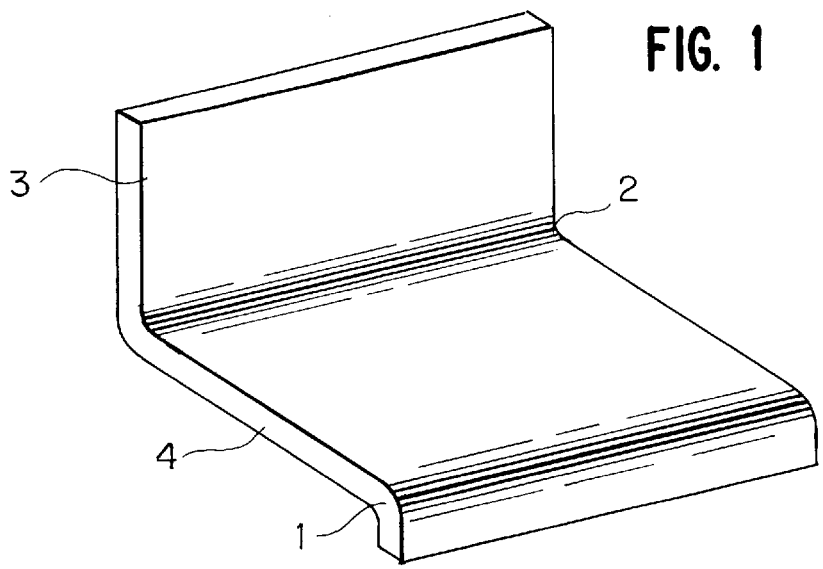
FIG. 1 shows the manner in which decorative postforming laminates must be able to be bent with either the decorative side 3 or the core side 4 in both tension and compression.

The above-stated object is achieved in this invention of an improved laminate constructed with a paper sheet enabling the laminate to be bent in both the forward and the backward direction as shown in FIG. 1 with little or no evidence of laminate failure or crazing wherein the paper sheet is comprised primarily of hardwood fibers which have been subjected to a particular mechanical action. The invention improved postformable laminate comprises a decorative layer, a core layer of saturable kraft, and an extensible sheet wherein the improvement comprises, as the extensible sheet, a sheet prepared from pulp comprising greater than about 50%, preferably greater than about 70% hardwood pulp and characterized by a tensile modulus of less than 600 kpsi and a basis weight of from about 80 to about 310 pounds/3,000 ft.$^2$, preferably from about 145 to about 160 pounds/3000 ft$^2$ wherein said pulp has been subjected to a mechanical treatment at an energy input of from about 2 to about 15 hp-days/ton.

DESCRIPTION OF THE PREFERRED EMBODIMENT(S)

Figure 2:
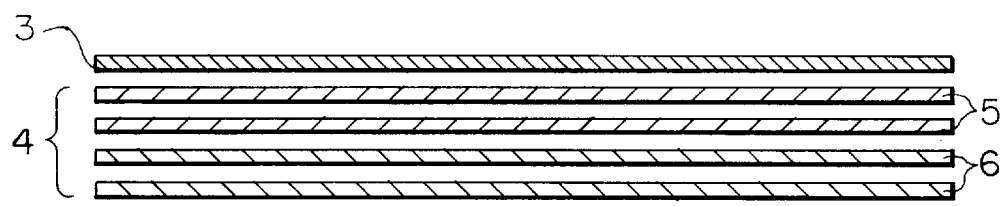
FIG. 2 depicts a cross-section view of a postforming laminate of current construction with multiple lightweight (normally <80 lbs./3,000 ft$^2$) postforming sheets 6 on the back of the core side 4 of the laminate.
Figure 3:
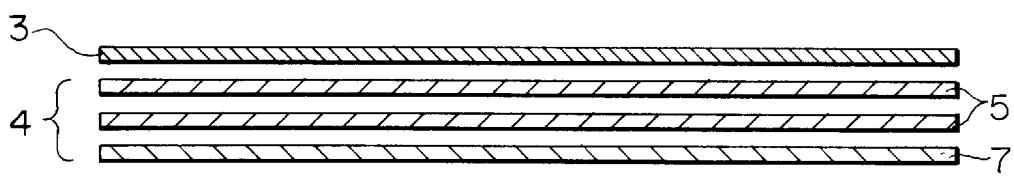
FIG. 3 shows, in cross-section, the construction of the laminates depicted in FIG. 1 and, in particular, the laminate construction wherein a single high basis-weight (>80 to about 310 lbs./3,000 ft$^2$) postforming sheet 7 has replaced the two sheets of the conventional construction shown in FIG. 2.

This invention describes new compositions for decorative postforming laminates. This invention also describes a process for the manufacture of a sheet that, when used in laminates having the new compositions, can be used to enhance the bending ability of decorative postforming laminates. Of particular interest is the appearance of the backbend with this sheet since it enables the laminate to be bent to a very tight radius of as low as ⅛" with negligible cracking or crazing. The construction of the laminates in this invention is shown in FIG. 3 where a single high basis-weight sheet has replaced the two sheets as shown in FIG. 2. For the purposes of this invention, the special postforming sheet is placed on the back of the laminate farthest away from the decorative sheet. As is well known to those proficient in the art of making laminates, a sand-off sheet, or portions of a sand-off sheet may remain on this outermost core sheet after final laminate production. Also, it is possible to use a plurality of these postforming sheets in the core in which case added benefits to bending are observed. In addition, the sheet described in this invention has improved treatability and production compared to lighter weight products that are currently used.

As earlier noted, U.S. Pat. No. 5,443,902 discloses the use of high coarseness, high kappa number, softwood pulp obtained predominantly from southern loblolly pine for the manufacture of a postforming sheet that gave excellent backbend characteristics to laminates. This invention describes the preferential use of shorter fibers (hardwood fibers) to attain similar bending characteristics that have been observed with softwood fibers. Surprisingly, however, the use of shorter fibers gave good bending characteristics while also providing for lower and more controlled resin saturation in a sheet. This is in direct contrast to earlier findings which indicated that long fibers were preferential for good postforming. The current invention discloses a method for producing laminates while using only a single sheet in the side farthest from the core. A release sheet may or may not be used in the laminate construction. The hardwood that is used in the preferred embodiment is treated in a device that effectively imparts a large amount of curling and kinking to the fiber.

A number of kinking and curling devices are known and include Frotapulpers (Ingersoll-Rand), Chemifiners (Black-Clawson), Micar Mixers (Black-Clawson), and Pressafiners (Andritz Sprout-Bauer). The devices listed above, as well as other devices to induce curling and kinking, may be used without departing from this invention. In the current invention, the means of adding improved postformability is only the use of curled and kinked fibers, produced by treating pulp in a device such as one of those indicated above. This is distinctly different from the current commercial products that employ unrestrained drying or other processes such as creping in order to achieve the desired effect of high CD stretch. The sheets that are the preferred embodiment of this invention have a cross-directional stretch of from about 1% to about 4%; whereas sheets with unrestrained drying have stretches in the cross-section of from 5% to 7%, and creped sheets can have CD stretch as high as 25%. The sheets that are the preferred embodiment of this invention also exhibit a lower MD/CD tensile ratio than the current commercial product. Although pulp for the current commercial product is believed to be treated in a Frotapulper, the treatment does not impart sufficient mechanical action (or energy) to the pulp to allow for good postforming (see Examples 2 and 3 in Table I). Other high-consistency devices that give curled fibers such as high-pressure, high-consistency refiners are also known to those skilled in the art.

In this invention, pulp is treated in a device that imparts curl and kinking to the fiber. While we do not wish to be limited to any theory concerning why a sufficiently large amount of fiber curling and kinking gives enhanced postforming, it appears that the curling and kinking imparted to the fibers by this treatment, without increasing bulk stretch in the sheet, is a controlling factor in determining the quality of the bends in the postforming laminate. In contrast to softwood-based sheets, which undergo a relatively large modulus decrease as more curled and kinked fibers are incorporated into the paper, hardwood-based sheets do not undergo such a large modulus decrease (Table I). Thus, while the tensile modulus of the invention sheet is no greater than 600 kpsi, the preferred range is from about 200 kpsi to about 600 kpsi. We have found that it is necessary to impart a sufficient amount of energy to the pulp in order to curl and kink a sufficient number of fibers to impart good bending characteristics to the laminates. From the examples, it can be seen that a sufficient amount is about 2 hp-days/ton of energy. Also, from a practical standpoint, due to the possibility of combustion, an upper limit of energy input is about 15 hp-days/ton.

A description of the effects of fiber curling and kinking on paper modulus has been given by Page, et. al., in *TAPPI*, 60, No. 4, 1977, p. 114; *TAPPI*, 62, No. 9, 1979, 99; and *TAPPI*, 63, No. 6, 1980, 113 which teachings are incorporated herein by reference. Kinked and curled fibers are lower modulus and essentially zero-load bearing fibers. They act as springs which are able to be stretched prior to bearing load. These fibers inhibit crack propagation since stress transfer to these fibers results in restretching (or uncoiling) the fibers, rather than causing continued fiber and/or matrix rupture and damage to the laminate. Although the modulus of the hardwood-based sheets are not as low at a given amount of fiber incorporation, another controlling factor in the modulus of paper is the amount of fiber to fiber bonding that occurs in a sheet. Since there are considerably more lower coarseness fibers per gram, there are more fiber to fiber bond sites which may occur in sheets containing lower coarseness fibers. Again, although we do not wish to be restricted to any theory, this gives a relatively higher modulus while still having spring-like fibers available for restretching and microdamage control during bending. The strain and moduli of sheets made using either softwood or hardwood having different amounts of fibers that have been treated to give curling and kinking are shown in Table II.

In addition to giving a sheet with excellent bending characteristics, the use of curled and kinked hardwood enables more controlled saturation characteristics in the sheet compared to pine. (See Table III.) This invention, therefore, enables the use of hardwood fibers. Not only do the hardwood fibers give sheets with more controlled saturation characteristics, but they also give sheets with better formation (i.e., lower local density variation). Therefore, the preferred embodiment of this invention encompasses the use of a predominantly hardwood furnish in the outermost layer of the laminate although other laminate constructions are possible without departing from this invention.

For purposes of evaluation, the visual appearance of the laminate bends was evaluated on a scale of five ("5") to one ("1") with a "5" rating being the best and a "1" rating being the worst. The scale used is as indicated below.

5=excellent appearance; no sign of crazing
4=very good appearance; only minor crazing lines appear
3=fair appearance; moderate degree of crazing but no cracking
2=poor appearance; severe crazing and some obvious cracking
1=very poor appearance; obvious through cracking

EXAMPLE 1

This example is for comparison purposes. Sheets consisting of a predominantly hardwood ($\geq 80\%$) furnish were fabricated at a basis weight of 150 lbs./3,000 ft$^2$ and 160 lbs./3,000 ft$^2$ using a standard 12"×12" handsheet mold. The sheets were wet-pressed in a static Williams press at 135 lbs./in$^2$ for 15 minutes. They were allowed to air-dry overnight with restraining rings. The dried sheets were treated with a phenolic resin to obtain between 24% and 28% resin content on a bone dry basis. The preferred amount of resin is between 27% and 28% on a bone dry basis. Each sheet so prepared was put into a laminate construction shown in FIG. 1 with a single hardwood-based sheet at the outermost section of the core. The other core sheets consisted of two 156 lbs./3000 ft$^2$ predominantly hardwood based sheets. A decorative layer also is used in the laminate construction. A laminate constructed in this fashion was pressed in a heated hydraulic press at from about 1000 psi to about 1200 psi for approximately 50 minutes to a maximum temperature of 265° F. The laminates next were removed from the press and cut into three-inch strips in the cross direction of the laminate. These strips were marked with wax that melts at 325° F. and heated over a radiant heater until the wax melted (about 30–35 seconds). The laminates then were bent with the core side in tension to a radius of ⅛", and the backs of the laminates were inspected for the appearance of crazing or other defects. Laminates made with a sheet containing only a hardwood furnish showed signs of cracking and crazing that indicated damage to the laminate; these laminates were given a "1" rating on the scale indicated above.

EXAMPLE 2

For comparative purposes, two sheets of lightweight bagstock sheets (75 lbs./3000 ft$^2$) from RePap Industries, LaPas, Alberta, Canada were treated to a resin content of between 27% and 30% using the same phenolic resin described in Example 1. Two of these sheets were then used as the back core sheets of a laminate as a substitute for the higher basis weight paper described in Example 1. When a laminate treated in a similar fashion as Example 1 was bent to a ⅛" radius, the laminate showed no signs of crazing and was generally rated as a "4" or "5" on the scale indicated above.

EXAMPLE 3

The lightweight bagstock sheet paper described in Example 2 (basis weight of 75 pounds/3000 ft$^2$) was rewet by soaking the paper for several minutes after which the paper was dried in restraining rings overnight. This dried paper was treated with phenolic resin and used on laminates as described in Example 2. When laminates containing this paper were bent, the backs of the laminates were largely crazed and showed significant signs of damage. These laminates generally obtained a "1" or a "2" rating. This comparison demonstrates that when the RePap sheet is dried under restraint (preventing cross-direction shrinkage) it loses its cross-directional stretch, resulting in loss of performance. This indicates that unrestrained drying is a necessary condition for performance of this sheet.

TABLE I

| Example | Modulus of Sheet (kpsi)* | Strain to Break of Sheet (%) | Laminate Bend Performance |
|---|---|---|---|
| 2 | 235 | 6.8 | 4 to 5 |
| 3 (Rewetted and Restrained Dried) | 240 | 3.7 | 1 |

*Moduli of sheets of all examples were measured by graphical analysis using an Instron tensile tester.

EXAMPLES 4–13

These examples demonstrate how this invention may be practiced with the treatment of unrefined hardwood pulp. These examples are shown for fiber treatment in an Andritz Sprout-Bauer Impressafiner device at an energy input level of between 2 and 15 hpdt. These sheets in Examples 4–13 were prepared by mixing untreated hardwood pulp with either treated hardwood pulp (Examples 4–8) or with treated softwood fibers (Examples 9–13), and at a basis weight as in Example 1. The percentage of curled and kinked fibers corresponds to listings in column number 2. Only when about 50% or greater curled and kinked hardwood fiber that has been treated at an energy level of between 2 and 15 hpdt is used do the bend ratings significantly change compared to a control with no curled or kinked fibers (Example 4). Results are indicated in the following Table II.

TABLE II

Modulus Decrease vs. Curled and Kinked Fiber Incorporation
Energy Input to Pulp Between 2 and 15 hpdt

| Example | Condition (% Curled and Kinked Fibers) | Modulus of Curled and Kinked Hardwood Sheets (kpsi) | Bend Rating |
|---|---|---|---|
| 4 | 0% | 1,104 | 1 |
| 5 | 25% | 794 | 1–2 |
| 6 | 50% | 596 | 2–3 |
| 7 | 75% | 379 | 4–5 |
| 8 | 100% | 236 | 4.5–5 |

| Example | Condition (% Curled and Kinked Fibers) | Modulus of Curled and Kinked Softwood Sheets (kpsi) | Bend Rating |
|---|---|---|---|
| 9 | 0% | 1,104 | 1 |
| 10 | 25% | 236 | 1–2 |
| 11 | 50% | 211 | 2–3 |
| 12 | 75% | 185 | 4–5 |
| 13 | 100% | 151 | 4–5 |

EXAMPLES 14–18

The examples (Table III) demonstrate that pulp which has been subjected to disk refining after treatment at between 2 and 15 hpdt to induce curling and kinking can also be used as a postforming sheet in laminates. Only at the highest energy inputs in disk refining (3.37 hpdt) did a slight decrease in performance occur. For these examples 100% of unrefined pulp had been subjected to mechanical treatment to induce curling and kinking, then subjected to disk refining.

TABLE III

| Example | Disk Refiner Energy Input (hpdt) | Laminate Bend Performance |
|---|---|---|
| 14 | 0 | 4–5 |
| 15 | 0.93 | 4–5 |
| 16 | 1.86 | 4–5 |
| 17 | 2.79 | 4–5 |
| 18 | 3.37 | 3.5–4 |

EXAMPLES 19–26

This example is to demonstrate that sheets made with curled and kinked hardwood have more controlled resin pickup. To conduct this study, machine-made paper was dipped into a resin bath, and subjected to pressure rolls to squeeze off excess surface resin. Since it is usually preferable to have resin contents in laminate core sheets at less than 30% based on the dry weight of resin, it can be seen from Table IV that sheets with curled and kinked hardwood fibers picked up resin in the desired range whereas sheets with curled and kinked softwood did not. For these examples, samples with a basis weight of 150 pounds/3,000 ft.$^2$ were used. The control pulp used for mixing with either curled or kinked pine or hardwood samples consisted of a hardwood furnish that had not been subjected to curling and kinking.

TABLE IV

| Example | Condition | Percent Phenolic Resin Pickup |
|---|---|---|
| 19 | Control (no Curled or kinked fibers) | 24.5 |
| 20 | 40% Curled and Kinked Pine | 30.6 |
| 21 | 60% Curled and Kinked Pine | 31.8 |
| 22 | 80% Curled and Kinked Pine | 33.5 |
| 23 | 20% Curled and Kinked Hardwood | 25.9 |
| 24 | 60% Curled and Kinked Hardwood | 27.6 |
| 25 | 80% Curled and Kinked Hardwood | 28.6 |
| 26 | 90% Curled and Kinked Hardwood | 29.3 |

While the invention has been particularly shown and described with reference to the preferred embodiments thereof, it will be understood by those skilled in the art that various alterations in form and detail may be made therein without departing from the spirit and scope of the invention.

What is claimed is:

1. An improved postformable laminate comprising a decorative layer, core layer of saturable kraft, and a postforming sheet wherein the improvement comprises, as the postforming sheet, a sheet prepared from wood pulp comprising greater than 50% treated hardwood pulp and characterized by a basis weight of from about 80 pounds/3,000 ft.$^2$ to about 310 pounds/3,000 ft.$^2$, a tensile modulus of from about 200 kpsi to about 600 kpsi and a cross directional stretch of from about 1% to about 4%, wherein said treated hardwood pulp is refined hardwood pulp subsequently subjected to a mechanical treatment at an energy input of from about 2 to about 15 hp-days/ton which imparts kinking and curling characteristics to individual pulp fibers.

2. The improved postformable laminate of claim 1 wherein the sheet's basis weight is from about 145 to about 160 pounds/3,000 ft.$^2$.

3. The improved postformable laminate of claim 1 wherein the mechanical energy input is from about 3 to about 15 hp-days/ton.

4. The improved postformable laminate of claim 3 wherein the mechanical energy input is from about 4 to about 15 hp-days/ton.

5. The improved postformable laminate of claim 1 wherein said hardwood pulp has been subjected to a multiple of the mechanical treatments.

6. The improved postformable laminate of claim 1 wherein said hardwood pulp is raised in temperature prior to the mechanical treatment.

7. The improved postformable laminate of claim 6 wherein the rise in temperature is produced by introducing steam into the hardwood pulp.

8. The improved postformable laminate of claim 1 wherein the hardwood pulp is subjected to a disk refining treatment subsequent to the mechanical treatment.

9. An improved postformable laminate comprising a decorative layer, core layer of saturable kraft, and a postforming sheet wherein the improvement comprises, as the postforming sheet, a sheet prepared from wood pulp comprising greater than 50% treated hardwood pulp and characterized by a basis weight of from about 80 to about 310 pounds/3,000 ft.$^2$, a tensile modulus of from about 200 kpsi to about 600 kpsi and a cross directional stretch of from about 1% to about 4%, wherein said treated hardwood pulp is unrefined hardwood pulp subsequently subjected to a mechanical treatment at an energy input of from about 2 to about 15 hp-days/ton which imparts kinking and curling characteristics to individual pulp fibers.

10. The improved postformable laminate of claim 9 wherein the sheet's basis weight is from about 145 to about 160 pounds/3,000 ft.$^2$.

11. The improved postformable laminate of claim 9 wherein the mechanical energy input is from about 3 to about 15 hp-days/ton.

12. The improved postformable laminate of claim 11 wherein the mechanical energy input is from about 4 to about 15 hp-days/ton.

13. The improved postformable laminate of claim 9 wherein said hardwood pulp has been subjected to a multiple of the mechanical treatments.

14. The improved postformable laminate of claim 9 wherein said hardwood pulp is raised in temperature prior to the mechanical treatment.

15. The improved postformable laminate of claim 14 wherein the rise in temperature is produced by introducing steam into the hardwood pulp.

16. The improved postformable laminate of claim 9 wherein the hardwood pulp is subjected to a disk refining treatment subsequent to the mechanical treatment.

* * * * *